United States Patent [19]

Peurifoy

[11] Patent Number: 4,978,100
[45] Date of Patent: Dec. 18, 1990

[54] FIRE HOSE CLAMP DEVICE

[76] Inventor: David L. Peurifoy, 448 Pinetree Way, Riverside, Calif. 92506

[21] Appl. No.: 312,224

[22] Filed: Feb. 21, 1989

[51] Int. Cl.⁵ .............................. F16K 7/06; B25B 1/10
[52] U.S. Cl. ........................................... 251/8; 7/138; 7/170; 269/127
[58] Field of Search ............... 251/7, 8; 137/327, 316; 7/138, 170; 269/126, 127, 129

[56] References Cited

U.S. PATENT DOCUMENTS

| | | | |
|---|---|---|---|
| 43,194 | 6/1864 | Glasser | 269/129 |
| 636,971 | 11/1899 | Forcier | 251/8 |
| 950,111 | 2/1910 | Miner | 251/8 |
| 1,837,645 | 12/1931 | Baash et al. | 269/126 |
| 2,070,143 | 2/1937 | Schisler | 251/8 |
| 2,680,000 | 6/1954 | Pulver | 251/8 |
| 3,410,517 | 11/1968 | Wall | 251/8 X |
| 3,422,469 | 1/1969 | Tunstall et al. | 7/170 |
| 3,504,388 | 4/1970 | Tunstall et al. | 7/170 |

FOREIGN PATENT DOCUMENTS

| | | | |
|---|---|---|---|
| 534159 | 1/1955 | Belgium | 251/8 |
| 595673 | 10/1925 | France | 251/8 |

Primary Examiner—John Rivell
Assistant Examiner—L. R. Leo
Attorney, Agent, or Firm—Boniard I. Brown

[57] ABSTRACT

A fire hose clamp that comprises a U-shaped guide structure for slidably supporting a movable jaw; a manual rotary screw extends from the movable jaw through a nut in the central wall of the U-shaped structure, whereby rotation of the screw moves the jaw along the guide structure. A stationary jaw is arranged in the path of the movable jaw, such that the two jaws exert a squeezing action on a fire hose extending through the jaw space; the hose fabric is flattened to shut off the flow of water through the hose. Preferably the jaws have curved surfaces that tend to iron away any creases or bulges in the hose fabric during the hose-squeezing operation, thereby assuring a more consistent water shut-off action.

5 Claims, 2 Drawing Sheets

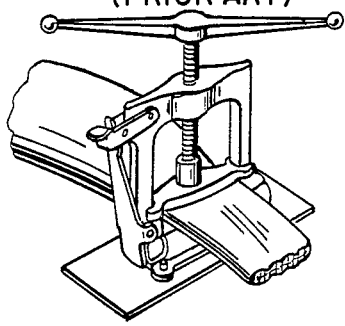
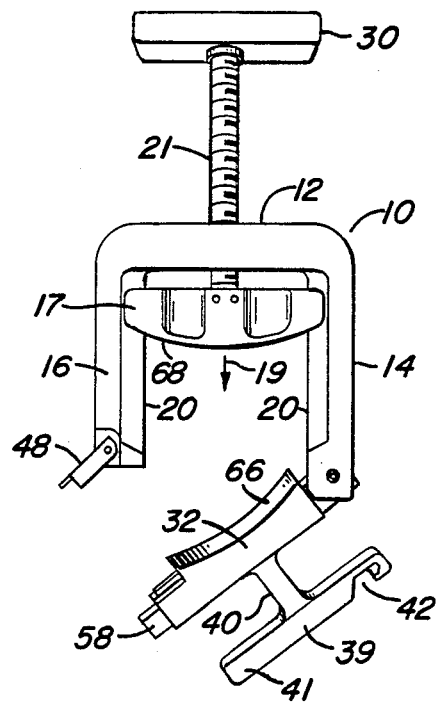
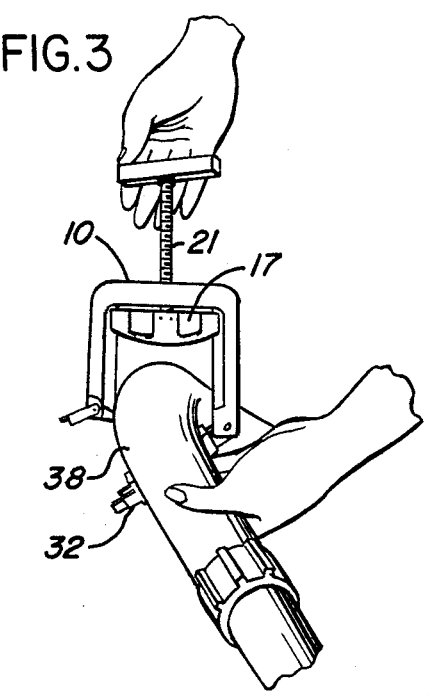
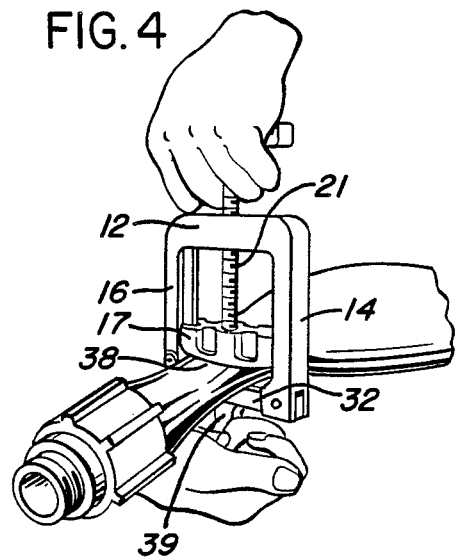
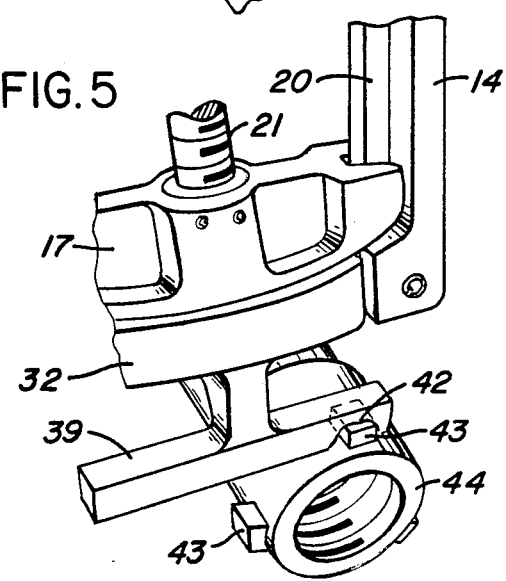
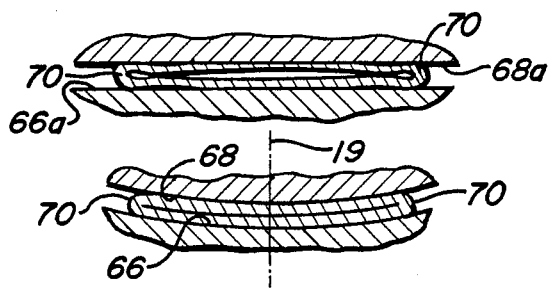

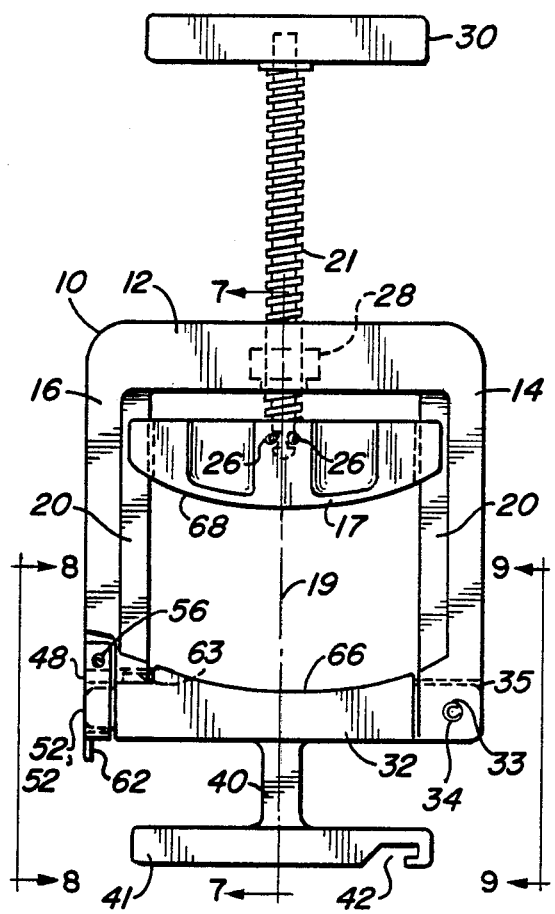
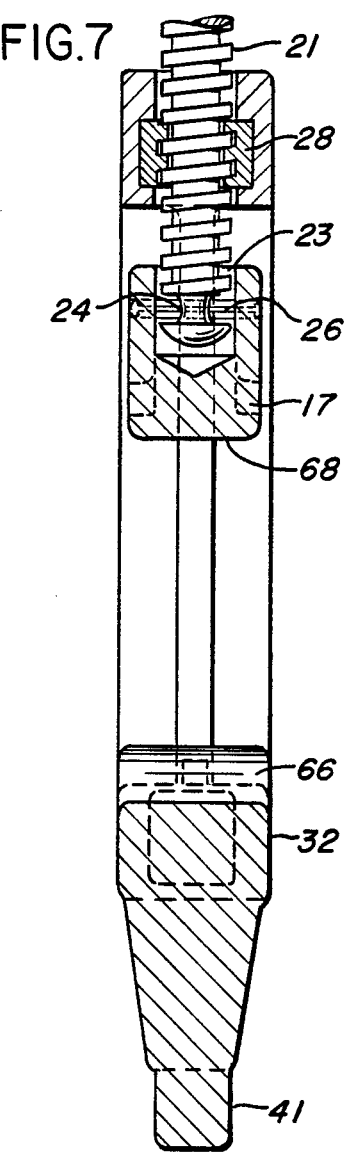
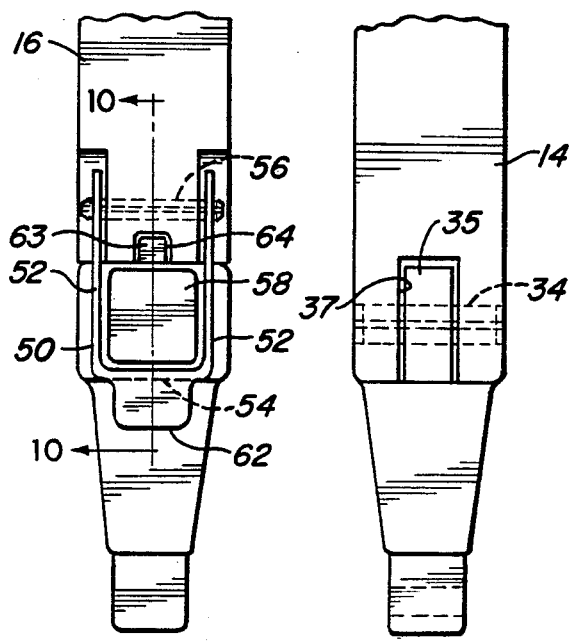
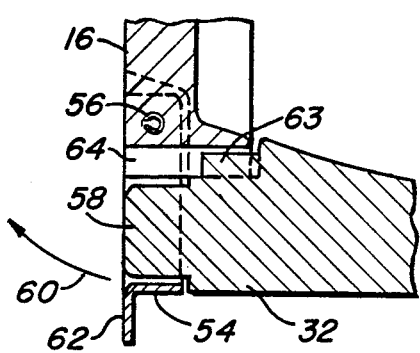

FIRE HOSE CLAMP DEVICE

BACKGROUND AND SUMMARY OF THE INVENTION

Fire fighting practice, in the case of forest fires or grass fires, sometimes involves the use of extensive lengths of fire hose. Commonly, one hose is connected to a water pump located a safe distance away from the fire source. Additional sections of hose are successively added, in series one after another, to form a hose system having a sufficient length to reach the fire. Often several sections of hose must be used.

Each hose section has metal threaded couplings on its ends for threaded connection with metal couplings on other hose sections, i.e., a male threaded coupling on the end of one hose section will be threaded into a female threaded coupling on the end of the next hose section. The hose section nearest the fire will have a water discharge nozzle screwed thereon.

During the course of a forest fire fighting operation it will be necessary from time to time to add sections of fire hose to the last hose section (i.e., the section nearest the blaze) in order to be able to move the water discharge nozzle to different places where the fire may be spreading. When adding a new section of hose to the last hose section it is necessary to first disconnect the water discharge nozzle, and to then screw on the new hose section to the last hose section, and to then screw the nozzle onto the end of the newly-added hose section. During this process it is desirable that the water flow through the connected hoses be temporarily halted. It is also desirable that the connected hoses remain filled with water during the hose connection process in order that the hose system be ready for resumption of the fire fighting process as soon as possible after reconnection of the water discharge nozzle to the new hose section.

Under preferred practice water flow through the water hose system is temporarily interrupted by cutting off the water flow at the last hose section, not back at the water pump. This cut-off process is often accomplished with the use of a hose clamp applied to the last section of hose near one of its metal couplings. The water discharge nozzle and hose couplings are disconnected and connected, with the clamp tightened down to completely restrict water flow through the last (final) hose section.

One known hose clamp used with fire hoses is a scissors clamp that, in practice, does not usually completely interrupt the water flow. Another prior art clamp used with fire hoses is a screw-operated device that requires the operator to stand on a special foot plate in order to manually rotate the screw.

The present invention is directed to a hose clamp of the screw-operated type. The clamp is designed so that it can be operated by one person solely with his two hands; he is not required to use his feet. A major aim of the invention is to provide a clamp that will completely cut off the water flow, even when relatively high water pressures are being used, e.g., 250 p.s.i. dynamic pressure.

Another object of the invention is to provide a clamp that will achieve a shut-off action in a reasonably short time span, but without subjecting the hose system to damaging water hammer effects.

A further object of the invention is to provide a clamp that will exert a hose-pinching action without crimping or otherwise cutting into the hose wall so as to prematurely shorten the hose service life.

An additional object of the invention is to provide a clamp that can be attached to the hose, then operated to interrupt water flow through the hose, and then removed from the hose, while the firefighter is wearing gloves; i.e., the firefighter is not required to remove his gloves while he is manipulating the hose clamp.

A further object of the invention is to provide a clamp that is relatively light in weight for easy handling or manipulation.

In one of its forms a clamp constructed according to the invention comprises a U-shaped guide structure for slidably supporting a movable jaw; a manual screw extends from that jaw through a nut in the central wall of the U-shaped structure, such that rotation of the screw drives the movable jaw toward or away from a stationary jaw that extends across the ends of the guide structure walls. Advancement of the movable jaw toward the stationary jaw causes the two jaws to cooperatively exert a squeezing action on a flexible water hose that extends through the intervening space between the two jaws. The movable jaw is advanced far enough that opposed sections of the water hose wall are flattened against one another so as to completely shut off the flow of water through the hose.

The stationary jaw is hingedly attached to one leg of the U-shaped guide structure so that it can be swung away from the movable jaw, thus opening a path for removal of the hose from the jaw space or insertion of another hose section into the jaw space.

The clamp is designed for easy operation and complete shut-off of the water flow through the hose section being gripped by the clamping jaws.

THE DRAWINGS

FIG. 1 is a perspective view of a prior art hose clamp.

FIG. 2 is an elevational view of a hose clamp forming one embodiment of the present invention.

FIG. 3 is a view taken in the same direction as FIG. 2, showing a water-inflated hose section being inserted into the space between the jaws of the illustrated clamp.

FIG. 4 is a perspective view showing the FIG. 3 hose clamp after the movable jaw has been moved to exert a squeeze force on the fire hose.

FIG. 5 is an enlarged fragmentary view of the FIG. 2 clamp, in use as a tool to rotate a coupling on the end of a fire hose section.

FIG. 6 is a view similar to FIG. 2, but showing the clamp in a different condition of adjustment.

FIG. 7 is an enlarged fragmentary sectional view taken on line 7—7 in FIG. 6.

FIG. 8 is a fragmentary end elevational view taken on line 8—8 in FIG. 6.

FIG. 9 is a fragmentary right end view taken on line 9—9 in FIG. 6.

FIG. 10 is a fragmentary sectional view taken on line 10—10 in FIG. 8.

FIG. 11 is a diagrammatic illustration comparing the jaw closure action of the FIG. 1 prior art clamp and the FIG. 2 clamp constructed according to the present invention.

DESCRIPTION OF A PREFERRED EMBODIMENT OF THE INVENTION

FIGS. 2 and 6 show one form that the invention can take. The illustrated fire hose clamp comprises a U- shaped guide structure 10 that includes a central wall 12 and two spaced parallel guide walls 14 and 16 extending right angularly from the central wall. A movable jaw 17 is located below wall 12 for guided movement along a movement path (axis) 19. Opposite ends of movable jaw 17 are grooved for slidable engagement on guide ribs 20 extending along the facing surfaces of guide walls 14 and 16.

Jaw 17 is operatively connected to a rotary screw 21, whereby manual rotation of the screw causes the jaw to be moved down away from wall 12, or up toward wall 12, depending on the direction of screw rotation. FIGS. 6 and 7 illustrate a drive connection between jaw 17 and screw 21. A cylindrical socket 23 is formed in jaw 17 to receive the lower end of screw 21. A peripheral groove 24 is formed in the side surface of screw 21. Two laterally spaced roll pins 26 are driven through holes in jaw 17 so as to extend through portions of peripheral groove 24 in the screw surface. These pins retain the screw against upward withdrawal out of socket while at the same time permitting the screw to rotate around the screw axis.

Screw 21 extends upwardly from jaw 17 through a steel nut 28 fixedly mounted in central wall 12 of U-shaped guide structure 10. Jaw 17 and guide structure 10 are preferably formed of aluminum for weight reduction purposes. Nut 28 may be affixed to wall 12 by casting guide structure 10 with the nut as an insert in the casting. Screw 21 and nut 28 are preferably formed of steel for wear resistance. A manual handle 30 is attached to the upper end of the screw. Manual rotation of the handle rotates the screw, which threads downwardly, or upwardly, through nut 28 to move jaw 17 away from (or toward) wall 12.

The illustrated clamp structure includes a second stationary jaw 32 having a hinged connection 33 with the lower end of guide wall structure 14. The hinged connection can include a roll pin 34 driven transversely through aligned circular openings in wall structure 14 and an ear-like end section 35 of the jaw structure. A slot 37 is formed in the end of wall structure 14 to receive the end section of jaw structure 32. FIG. 6 shows stationary jaw 32 in its operating position extending across the space between guide walls 14 and 16. FIG. 2 shows jaw 32 swung down away from jaw 17 to a so-called "hose-access" position. When jaw 32 is in its FIG. 2 position a path is provided for movement of a fire hose into or out of the space circumscribed by U-shaped guide structure 10. FIG. 3 shows generally how a fire hose section 38 can be moved past the swung-down jaw 32 into the space below movable jaw 17. Jaw 32 is considered to be a "stationary" jaw in the sense that when it is in the FIG. 6 operating position it is immovable relative to guide structure 10; jaw 17 is a movable jaw cooperable with stationary jaw 32 to exert a squeeze force on the intervening fire hose section (not shown in FIG. 6).

Swinging movement of jaw 32 around hinged connection 33 is facilitated by a T-shaped handle structure 39. Vertical leg 40 of the T structure extends away from jaw 32, whereas the horizontal leg 41 of the T structure extends across the vertical leg in spaced parallelism with jaw 32. As best seen in FIG. 4, the handle structure can be sized so that the firefighter's fingers of one hand encircle the horizontal leg 41 of the handle structure while his other hand is used to rotate screw 21 to enable jaws 17 and 32 to apply a clamping force on a water hose section 38. Handle structure 39 can also be grasped to swing jaw structure 32 between the FIG. 2 position and the FIG. 6 position.

FIGS. 5 and 6 show a notch 42 formed in horizontal leg 41 of handle structure 39. The notch is configured to fit onto a lug 43 that constitutes part of a conventional metal end fitting (coupling) 44 for a conventional fire hose. With notch 42 fitting onto lug 43, a manual turning force may be applied to the hose clamp mechanism to turn the associated coupling. Thus, the illustrated hose clamp can be used as a turning implement (wrench) to tighten or loosen the screw thread joint between engaged couplings on associated fire hose sections. This dual usage of the hose clamp is advantageous in that it facilitates completion of the hose connection-disconnection process without need for a separate wrench. The firefighter does not need to carry a separate wrench with him while trying to put out a forest fire or brush fire.

Jaw 32 is retained in its FIG. 6 operating position by means of a swingable latch structure 48 carried on the free end of guide wall 16. The latch structure comprises a U-shaped strap 50, preferably formed of steel for strength purposes. The strap U configuration includes two spaced parallel strap walls 52 and an interconnecting web wall 54. A roll pin 56 is driven through aligned openings in strap walls 52 and wall 16, to form a pivot structure for the U-shaped strap.

In its FIG. 6 position strap 50 encircles the tip end 58 of jaw 32. End 58 preferably has a reduced width and height so as to fit into the space circumscribed by strap 50 (FIGS. 8 and 10). The U-shaped strap can be manually swung away from tip end 58 of jaw 17, as indicated by arrow 60 in FIG. 10. With the strap swung away from tip end 58, jaw structure 32 can be swung downwardly from the FIG. 10 operating position to the FIG. 2 hose-access position. A readily accessible tab 62 may be formed integrally with strap 50 to facilitate the swinging motion of the strap, preferably by finger pressure on the tab surface. The firefighter can apply the necessary finger pressure without removing his gloves.

Latch structure 48 (strap 50) acts to prevent swinging motion of jaw 32 when the jaw is in its operating position (FIGS. 6 and 10). Lateral (sidewise) dislocation of jaw 32 is prevented by a tongue-slot means shown in FIGS. 8 and 10. A tongue 63 is integrally formed with jaw 32 for entry into a slot or groove 64 formed in the lower end face of guide wall 16. The side surfaces of slot 64 are in close adjacency to the tongue 63 side surfaces, such that jaw 32 is prevented from wobble or other dislocation normal to the general plane of U-shaped guide structure 10. As previously noted, strap 50 prevents downward dislocation of jaw 32 around hinged connection 33. Thus, strap 50 and the tongue-slot mechanism cooperatively prevent jaw 32 from undesired motion in two different planes (i.e., in the general plane of guide structure 10 and transverse to that plane). Accordingly, jaw 32 forms an immovable part of guide structure 10 when it is in its FIG. 6 operating position.

It will be seen from FIG. 6 that the curved upper surface 66 of jaw 32 has a concave curvature, whereas the lower curved surface 68 of jaw 17 has a convex curvature. Preferably the curvatures are the same, or approximately the same, so that when the two surfaces are in close proximity to one another (as in FIG. 11) they will be parallel. The radius of curvature of each jaw surface 66 and 68 is preferably about four and onehalf inch. The surfaces are centered on imaginary points along movement axis 19.

By curving the jaw surfaces it is believed possible to more consistently achieve a complete shut-off of the water flow. Referring to FIG. 11, as curved jaw surface 68 moves toward surface 66, the upper fold of the flexible fire hose wall tends to be spread apart due to the curved nature of surface 68, i.e., curved surface 68 acts something like a cam surface to exert a tension force on the hose fabric. The fabric tends to drape itself around surface 68 so as to remove creases or bulges that might otherwise form in the fabric.

FIG. 11 includes a pictorial representation of a prior art jaw surface configuration that includes two opposed flat (non-curved) jaw surfaces 66a and 68a. The flat jaw surfaces do not tend to achieve the fabric-spreading action that is believed to take place with curved surfaces 66 and 68.

The hose fabric is flexible, but is nevertheless somewhat stiff. Therefore the end connecting zones 70 between the upper and lower fabric folds tend to be somewhat thicker than the central areas of the fabric folds near movement axis 19. The flat jaw surfaces 66a and 68a are required to crush the end zones 70 in order to have the central areas of the upper and lower folds come into full engagement. The crushing action does not fully iron out creases in the fabric material, particularly in the central areas near axis 19. Accordingly, when flat jaw surfaces are used there may be some areas along the fabric cross section where the upper fold does not come into intimate sealed contact with the lower fold. The flat surfaced jaws may not always achieve a complete water shut-off action.

With the curved jaw surface configuration, the convexly curved surface 68 tends to roll the fabric connecting zones 70 outwardly away from central movement axis 19. Zones 70 are thus flattened, both by a downward crushing action and also by an outward rolling action. Any creases near the central movement axis 19 tend to be ironed outwardly so as to disappear. Use of curved jaw surfaces 66 and 68 is believed to offer a complete water shut-off action on a consistent basis.

Thus there has been shown and described a novel fire hose clamp device which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A clamp for a flexible fire hose, comprising:
    a U-shaped guide means that includes a central wall and two spaced parallel guide walls extending therefrom,
    a movable jaw having opposite ends thereof slidably engaging the guide walls whereby said jaw is movable toward and away from said central wall, a nut mounted in said central wall,
    a rotary screw extending from said movable jaw through the nut, whereby manual rotation of the screw produces slidable movement of the movable jaw, a stationary jaw having a hinged connection with one of said guide walls at a point thereon remote from the central wall, whereby said stationary jaw can be swung between an operating position extending across the space between the two guide walls and a hose-access position extending away from the movable jaw, said stationary jaw being configured so that when it is in the hose-access position a path is provided for movement of a fire hose into or out of the space circumscribed by the U-shaped guide means, a handle structure connected to said stationary jaw to facilitate swinging movement thereof, said handle structure having a T-configuration oriented so that a vertical leg of the T extends away from the stationary jaw and a horizontal leg of the T extends across the vertical leg in spaced parallelism to the stationary jaw,
    a notch formed in the horizontal leg of the T-shaped handle, said notch being configured to fit onto a lug on a conventional fire hose coupling, whereby the coupling can be rotated to loosen or tighten two engaged couplings without using additional tools, and latch means carried by the other guide wall remote from the central wall for releasably retaining the stationary jaw in its operating position extending across the space between the two guide walls.

2. A hand-held clamp for a flexible fire hose, comprising:
    a U-shaped guide means that includes a central wall and two spaced parallel guide walls extending therefrom,
    a movable jaw having opposite ends thereof slidably engaging the guide walls whereby said jaw is movable toward and away from said central wall, a nut mounted in said central wall,
    a rotary screw extending from said movable jaw through the nut, whereby manual rotation of the screw produces slidable movement of the movable jaw, a stationary jaw having a hinged connection with one of said guide walls at a point thereon remote from the central wall, whereby said stationary jaw can be swung between an operating position extending across the space between the two guide walls and a hose-access position extending away from the movable jaw, said stationary jaw being configured so that when it is in the hose-access position a path is provided for movement of a fire hose into or out of the space circumscribed by the U-shaped guide means, a handle structure connected to said stationary jaw to facilitate swinging movement thereof, said handle structure having a T-configuration oriented so that a vertical leg of the T extends away from a central point on the stationary jaw and a horizontal leg of the T extends across the vertical leg in spaced parallelism to the stationary jaw, and
    latch means carried by the other guide wall remote from the central wall for releasably retaining the stationary jaw in its operating position extending across the space between the two guide walls.

3. The clamp of claim 2, wherein:
    said latch means comprises a pivot pin extending through said other guide wall, and a U-shaped strap having spaced walls thereof connected to opposite ends of said pivot pin, whereby said strap can be manually swung around the pivot pin axis,
    said stationary jaw having a tip end thereof located within the movement path of the U-shaped strap when the stationary jaw is in an operating position extending across the space between the two guide walls, whereby said strap releasably retains the stationary jaw in its operating position, said U-shaped strap comprising a web wall (54) and two spaced walls (52) connected to opposite ends of said pivot pin, said strap having its transverse thickness plane extending normal to the plane of the U configuration, and a tab (62) extending from the web wall in a direction away from the pivot pin for manual operation of the strap.

4. A clamp according to claim 3, wherein:

said pivot pin has its axis so disposed that the U-shaped strap forms a longitudinal planar extension of said other guide wall when it is in position to retain the stationary jaw in its operating position.

5. A hand-held clamp for a flexible fire hose, comprising:

U-shaped guide means 10 comprising a central wall 12 and two spaced parallel guide walls 14, 16 extending therefrom, each guide wall having a free end spaced from the central wall, a movable jaw 17 having opposite ends thereof slidably engaging the guide walls, a nut 28 mounted in said central wall, and a rotary screw 21 extending from said movable jaw through the nut, whereby manual rotation of the screw produces slidable movement of the movable jaw toward and away from said central wall, a stationary jaw 32 having a hinged connection 33 with one of said guide walls near its free end, whereby said stationary jaw can be swung between an operating position extending across the space between the two guide walls and a hose-access position extending away from the movable jaw, said stationary jaw being so configured that when it is in the hose-access position a path is provided for movement of a fire hose into or out of the space circumscribed by the U-shaped guide means, a handle (at 40, 41) connected to said stationary jaw to facilitate swinging movement thereof, latch means 48 carried on the free end of the other guide wall for releasably retaining the stationary jaw in its operating position wherein it extends across the space between the two guide walls, said other guide wall parallel to the swing axis of the aforementioned hinged connection 33, and a U-shaped strap 50 having a web wall 54 and two spaced walls 52 connected to opposite ends of said pivot pin, whereby said strap can be manually swung around the pivot pin axis between a latching position and an unlatched position, said other guide wall having a free end surface extending normal to the axis of said rotary screw 21, a groove 64 extending within and through said free end surface normal to the pivot pin axis, said stationary jaw having a tip end portion 58 located in the movement path of the U-shaped strap when the stationary jaw is in an operating position, whereby said strap releasably retains the stationary jaw in its operating position, said tip end portion 58 having a side surface thereof engageable against said free end surface, and a tongue 63 projectable from said side surface into said groove 64 so that the groove side surfaces prevent dislocation of the stationary jaw transversely of the groove, said one guide wall 14 being longer than the other guide wall, whereby that said one guide wall has a free end surface spaced from the central wall 12 a greater distance than said free end surface of said other guide wall, said stationary jaw having a handle attachment surface located in a common plane with the web wall of the U-shaped strap and the free end surface of said one guide wall when said stationary jaw is in its operating position, and said latch means comprising a tab 62 extending from the web wall of the U-shaped strap away from said pivot pin 56, said tab extending normal to said common plane when the latch means is in its latching position wherein the stationary jaw is retained in its operating position, said tab 62 being freely accessible for finger actuation to swing the strap about the pivot pin axis.

* * * * *